US012666208B2

(12) United States Patent
Jansen et al.

(10) Patent No.: US 12,666,208 B2
(45) Date of Patent: Jun. 23, 2026

(54) SYSTEMS AND METHODS FOR INDUCING MODULATION OF USER'S VOICE LEVEL BY A HEARING DEVICE

(71) Applicant: SONOVA AG, Staefa (CH)

(72) Inventors: Sofie Jansen, Zürich (CH); Robert Baur, Männedorf (CH); Stefan Pislak, Stäfa (CH); Ullrich Sigwanz, Hombrechtikon (CH)

(73) Assignee: Sonova AG, Staefa (CH)

( * ) Notice: Subject to any disclaimer, the term of this patent is extended or adjusted under 35 U.S.C. 154(b) by 145 days.

(21) Appl. No.: 18/622,291

(22) Filed: Mar. 29, 2024

(65) Prior Publication Data

US 2025/0310704 A1 Oct. 2, 2025

(51) Int. Cl.
*H04R 25/00* (2006.01)

(52) U.S. Cl.
CPC ....... *H04R 25/505* (2013.01); *H04R 2225/41* (2013.01); *H04R 2225/43* (2013.01); *H04R 2430/01* (2013.01)

(58) Field of Classification Search
CPC .............. H04R 25/505; H04R 2225/41; H04R 2225/43; H04R 2430/01
USPC ...................................................... 381/57, 56
See application file for complete search history.

(56) References Cited

U.S. PATENT DOCUMENTS 4,259,547 A * 3/1981 Valley .................. H04R 25/554 381/23.1
10,873,816 B2 12/2020 Feilner
11,388,514 B2 7/2022 Goekay et al.
2018/0232511 A1 8/2018 Bakish
2020/0042285 A1 2/2020 Choi et al.
2020/0051546 A1 2/2020 Iwase et al.
2021/0289070 A1 9/2021 Thomson
2022/0103682 A1 3/2022 Thomson

FOREIGN PATENT DOCUMENTS

CN 112492495 B 9/2022
DE 102019218802 A1 6/2021
JP 5256119 B2 8/2013
WO 2011022314 A1 2/2011
WO 2018193826 A1 10/2018
WO 2022026481 A1 2/2022

* cited by examiner

*Primary Examiner* — Thjuan K Addy

(74) *Attorney, Agent, or Firm* — ALG Intellectual Property, LLC

(57) ABSTRACT

An exemplary method includes a hearing system determining an own voice sound level representative of a sound level of a voice of a user of a hearing device, determining an environmental sound level representative of a sound level of an environment of the user while the user uses the hearing device, and adjusting, based on the own voice sound level and the environmental sound level at least one of a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user.

20 Claims, 9 Drawing Sheets

SYSTEMS AND METHODS FOR INDUCING MODULATION OF USER'S VOICE LEVEL BY A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Hearing devices may implement sound processing algorithms that are configured to improve hearing performance of the hearing devices. For instance, hearing devices may process speech and background noise differently to enhance speech understanding. However, users of such hearing devices may have difficulty determining a suitable sound level of their own voice while using the hearing devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for inducing modulation of a user's voice level by a hearing device are described herein. As will be described in more detail below, an exemplary system may comprise a memory storing instructions and a processor communicatively coupled to the memory and configured to execute the instructions to perform a process. The process may comprise determining an own voice sound level representative of a sound level of a voice of a user of a hearing device, determining an environmental sound level representative of a sound level of an environment of the user while the user uses the hearing device, and adjusting, based on the own voice sound level and the environmental sound level at least one of a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user.

By using systems and methods such as those described herein, it may be possible to induce a user to modulate his or her own voice to a sound level that is appropriate for an environment of the user. For instance, a user listening to streaming audio being provided by a hearing device may have difficulty gauging a sound level of the environment of the user. This may be due to various factors, such as active noise canceling being performed by the hearing device, an occlusion of the user's ears to the environmental sound by the hearing device, a sound level of the streaming audio compared to the environmental sound level, hearing impairment of the user, etc. Thus, when the user speaks, the user may speak with a voice sound level that is appropriate for the sound level of the streaming audio rather than the sound level of the environment. This may be due to the Lombard effect, where a speaker may involuntarily increase their voice sound level in the presence of a noisy environment or conversely, decrease their voice sound level in the presence of a quiet environment.

Systems and method described herein may take advantage of the Lombard effect to induce the user to speak with a voice sound level that is appropriate to the environment by adjusting, based on the sound level of the user's voice and the sound level of the environment, a sound level of the streaming audio being presented to the user. In this manner (and as other examples described herein), the system may improve the experience of the hearing device by the user and for conversation partners of the user. Other benefits of the systems and methods described herein will be made apparent herein.

Figure 1:
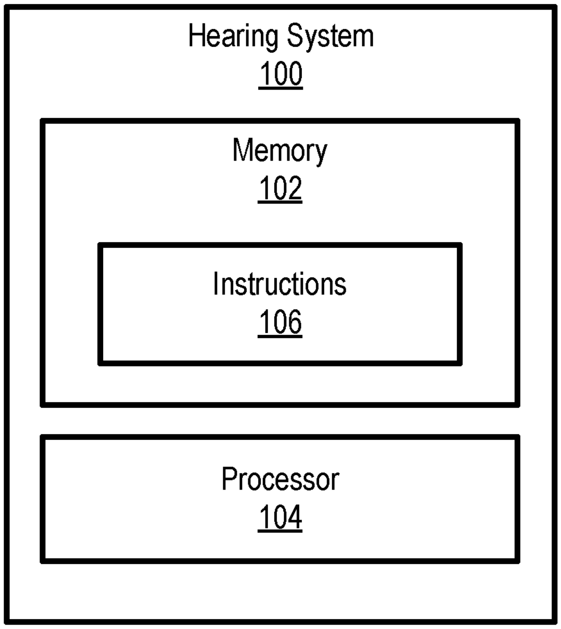
FIG. 1 illustrates an exemplary hearing system that may be implemented according to principles described herein.

FIG. 1 illustrates an exemplary hearing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device such as described herein. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store hearing loss profile data, user preference data, setting data, acoustic parameter data, machine learning data, input sound classification data, hearing performance data, graphical user interface content, and/or any other suitable data.

Processor 104 may be configured to perform (e.g., execute instructions 106 stored in memory 102 to perform) various processing operations associated with inducing modulation of a user's voice level. For example, processor 104 may perform one or more operations described herein to adjust, based on an own voice sound level and an environmental sound level, a streaming sound level representative of a sound level of audio being streamed to a hearing device from a source device communicatively coupled to the hearing device. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

In some examples, a hearing device may additionally or alternatively be implemented by earbuds, headphones, hearables (e.g., smart headphones), and/or any other suitable device that may be used to facilitate a user perceiving sound in an environment. In such examples, the user may correspond to either a hearing impaired user or a non-hearing impaired user.

Figure 2:
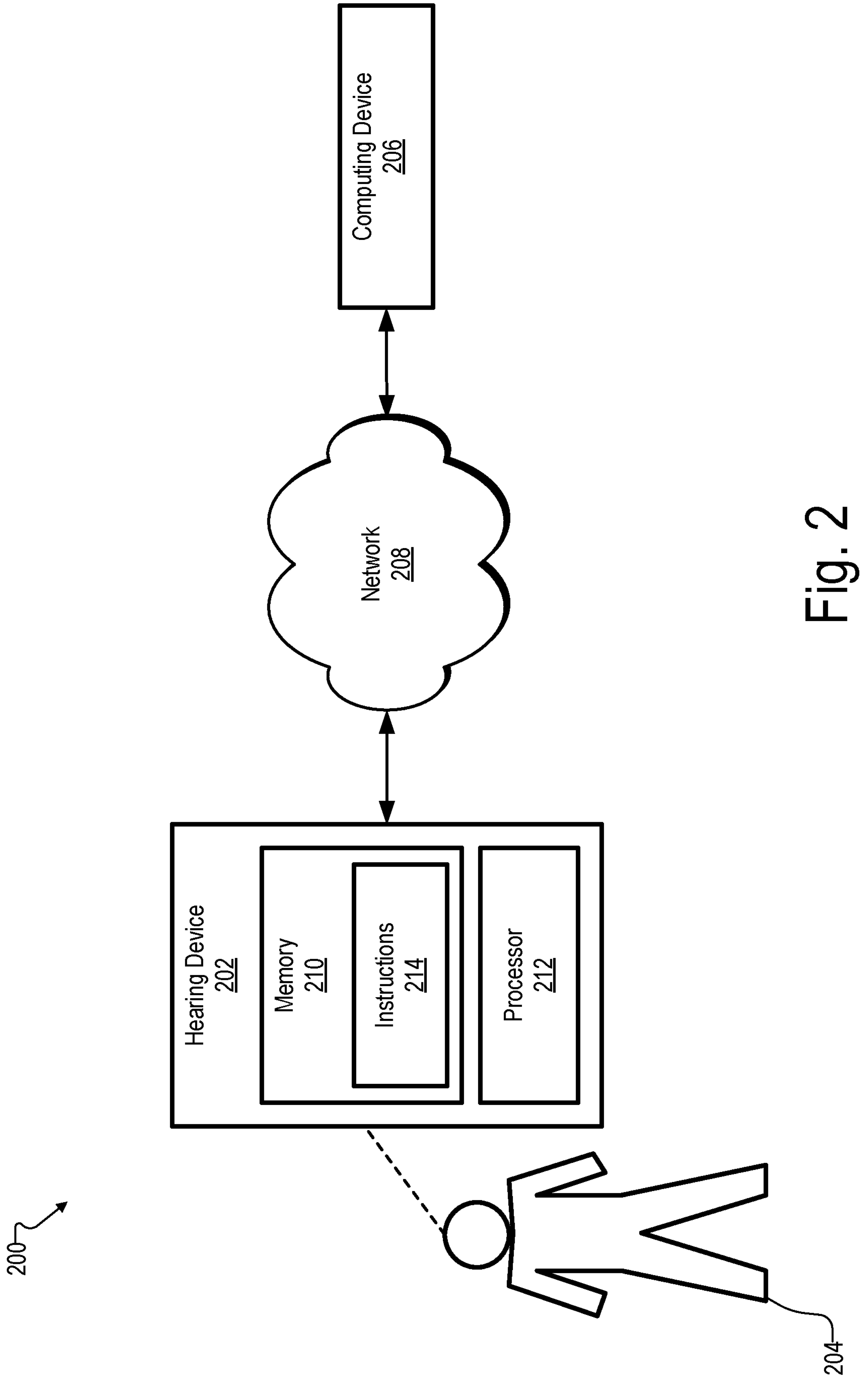
FIG. 2 illustrates an exemplary implementation of the hearing system of FIG. 1 according to principles described herein.

System 100 may be implemented in any suitable manner. For example, system 100 may be implemented by a hearing device or a binaural hearing system and/or a computing device that is communicatively coupled in any suitable manner to the hearing device or the binaural hearing system. To illustrate an example, FIG. 2 shows an exemplary configuration 200 in which a hearing device 202 associated with a user 204 is communicatively coupled to a computing device 206 by way of a network 208. In configuration 200, system 100 may be implemented entirely by computing device 206, entirely by hearing device 202, and/or by both computing device 206 and hearing device 202.

Hearing device 202 may correspond to any suitable type of hearing device such as described herein. Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Memory 210 may maintain (e.g., store) executable data used by processor 212 to perform any of the operations associated with hearing device 202. For example, memory 210 may store instructions 214 that may be executed by processor 212 to perform any of the operations associated with hearing device 202 assisting a user in hearing. Instructions 214 may be implemented by any suitable application, software, code, and/or other executable data instance or additionally or alternatively implemented as analog signal processing.

Memory 210 may also maintain any data received, generated, managed, used, and/or transmitted by processor 212. For example, memory 210 may maintain any suitable data associated with a hearing loss profile of a user, input sound classifications, sound processing patterns, machine learning algorithms, and/or hearing device function data. Memory 210 may maintain additional or alternative data in other implementations.

Processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software. In certain examples, processor 212 may correspond to or otherwise include one or more deep neural network ("DNN") chips configured to perform any suitable machine learning operation such as described herein.

User 204 may be any individual that is a user of a hearing device. For example, the hearing device may present to user 204 sound streamed to the hearing device by a source device, such as computing device 206 and/or any other device configured to provide audio and be communicatively connected to the hearing device. For example, sound may be streamed to the hearing device via radio frequency (RF) signals, such as via a Bluetooth connection, a mobile phone network, or an internet connection, or also via inductive coupling with the source device, which may provide for, e.g., unidirectional, multidirectional, or broadcast signal transmission. The hearing device and/or computing device 206 may be configured to determine an own voice sound level of user 204 and an environmental sound level and adjust, based on the own voice sound level and the environmental sound level a streaming sound level of the audio streamed to the hearing device from the source device. In such a manner, the hearing device and/or computing device 206 may be configured to induce a modulation of the own voice level of user 204 so that the voice level of user 204 may be suitable given the environmental sound level.

Computing device 206 may include or be implemented by any suitable hardware and/or software components (e.g., processors, memories, communication interfaces, instructions stored in memory for execution by the processors, etc.) and may include any combination of computing devices as may serve a particular implementation. In some examples, computing device 206 may be implemented by a mobile phone, a mobile computing device, a tablet computer, a laptop computer, a desktop computer, a server or server system, and/or any other suitable computing device and/or system that may be configured to induce modulation of a voice level of user 204 by the hearing device. In such examples, computing device 206 may be configured to perform any suitable operations such as those described herein to induce modulation of the voice level of user 204 by adjusting a sound level of audio streamed to the hearing device from a source device (which may be implemented by and/or include computing device 206).

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 206. In certain examples, network 208 may be implemented by a Bluetooth protocol (e.g., Bluetooth Classic, Bluetooth Low Energy ("LE"), etc.) and/or any other suitable communication protocol to facilitate communications between hearing device 202 and computing device 206. Communications between hearing device 202, computing device 206, and any other device/system may be transported using any one of the above-listed networks, or any combination or sub-combination of the above-listed networks. Alternatively, computing device 206 may be connected directly to hearing device 202 without the use of a network. For example, computing device 206 may be connected to hearing device 202 by way of a wired connection.

Figure 3:
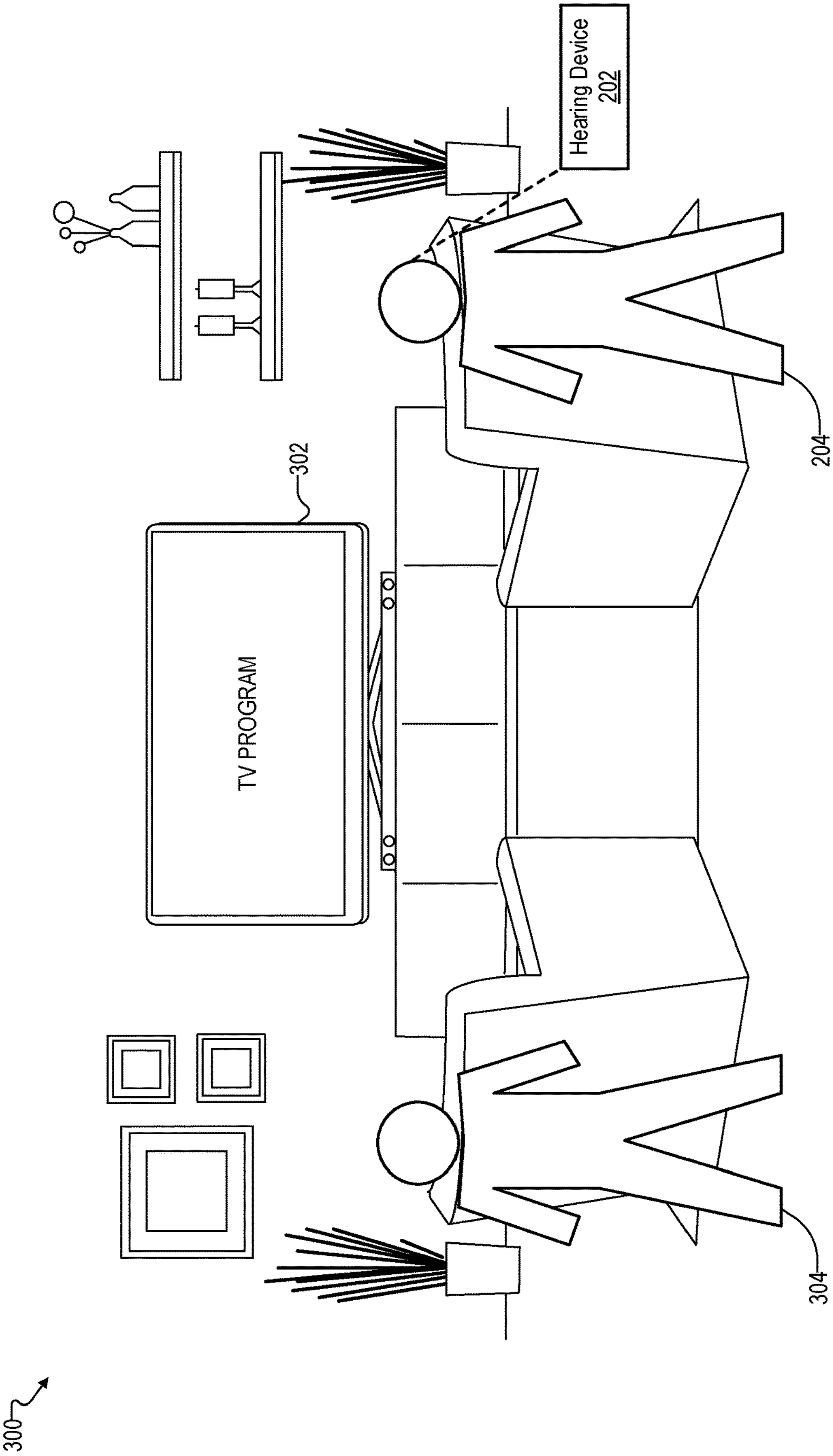
FIGS. 3-5 illustrate exemplary configurations that may be provided according to principles described herein.

Hearing device 202 may be configured to present sound to user 204 from a source device communicatively coupled to hearing device 202. For example, FIG. 3 shows an exemplary implementation 300, where the source device may be implemented as a television (TV) 302. TV 302 may be a smart TV that may be configured to connect to hearing device 202 to stream audio (e.g., from TV and/or audio content being presented on TV 302) directly to hearing device 202 (e.g., via Bluetooth and/or any other protocol such as network 208). The streaming audio may be provided to user 204 at a particular sound level (e.g., as selected by user 204). User 204 may be watching TV 302 with another person, who may be a conversation partner 304. Conversation partner 304 may be listening to audio from TV 302 as emitted by TV 302 directly into the environment, without use of hearing device 202 or any other hearing device.

At some point, user 204 and conversation partner 304 may engage in a conversation while watching TV 302. However, for user 204, due to the sound level of the streaming audio being presented to user 204, when user 204 speaks to conversation partner 304, user 204 may have difficulty gauging an appropriate sound level for his or her own voice. For instance, user 204 may be susceptible to the Lombard effect, and depending on the sound level of the streaming audio being presented by hearing device 202, the voice level of user 204 may be too high or too low for an expected conversational sound level given the sound level of the surrounding environment (which in implementation 300 may be primarily the sound level of the direct output of TV 302, which may be different from the sound level of TV 302 being streamed to user 204 via hearing device 202).

As another example, such an effect may be heightened if user 204 is listening to streaming audio that conversation partner 304 is not hearing at all (e.g., user 204 listening to music or watching a video on a personal device). In such an example the environmental sound level may be very low but user 204 may speak relatively very loudly as user 204 attempts to speak over the streaming audio that only user 204 hears. This may be exacerbated if user 204 has difficulty gauging the environmental sound level, whether due to hearing impairment, occlusion of the ears by hearing device 202, and/or the sound level of the streaming audio dominating the environmental sound level (e.g., as hearing device 202 may be exclusively presenting the streaming audio and not the environmental sound to user 204 and/or actively canceling environmental sound, e.g., implementing active noise canceling).

To address this issue, system 100 may be configured to detect when user 204 is speaking and determine an own voice sound level representative of a sound level of a voice of user 204. Further, system 100 may determine an environmental sound level representative of a sound level of an environment of user 204 while user 204 uses hearing device 202. Based on the own voice sound level and the environmental sound level, system 100 may adjust a streaming sound level representative of a sound level of the audio being streamed to hearing device 202 from a source device. By adjusting the streaming sound level, system 100 may induce user 204 to also adjust (e.g., via the Lombard effect) the own voice level of user 204 so that the own voice level is suitable to the environmental sound level. Additionally or alternatively, system 100 may adjust a presented environmental sound level representative of a sound level of environmental sound being presented to user 204 in addition to the streamed audio.

For instance, in implementation 300, system 100 may determine based on the own voice sound level and the environmental sound level that user 204 is speaking too loudly relative to the environmental sound level and decrease the sound level of the audio streaming from TV 302 to hearing device 202. By decreasing the sound level of the streaming audio and/or the presented environmental audio, system 100 may induce user 204 to also decrease the own voice level of user 204 to an appropriate level for a conversation with conversation partner 304.

Figure 4:
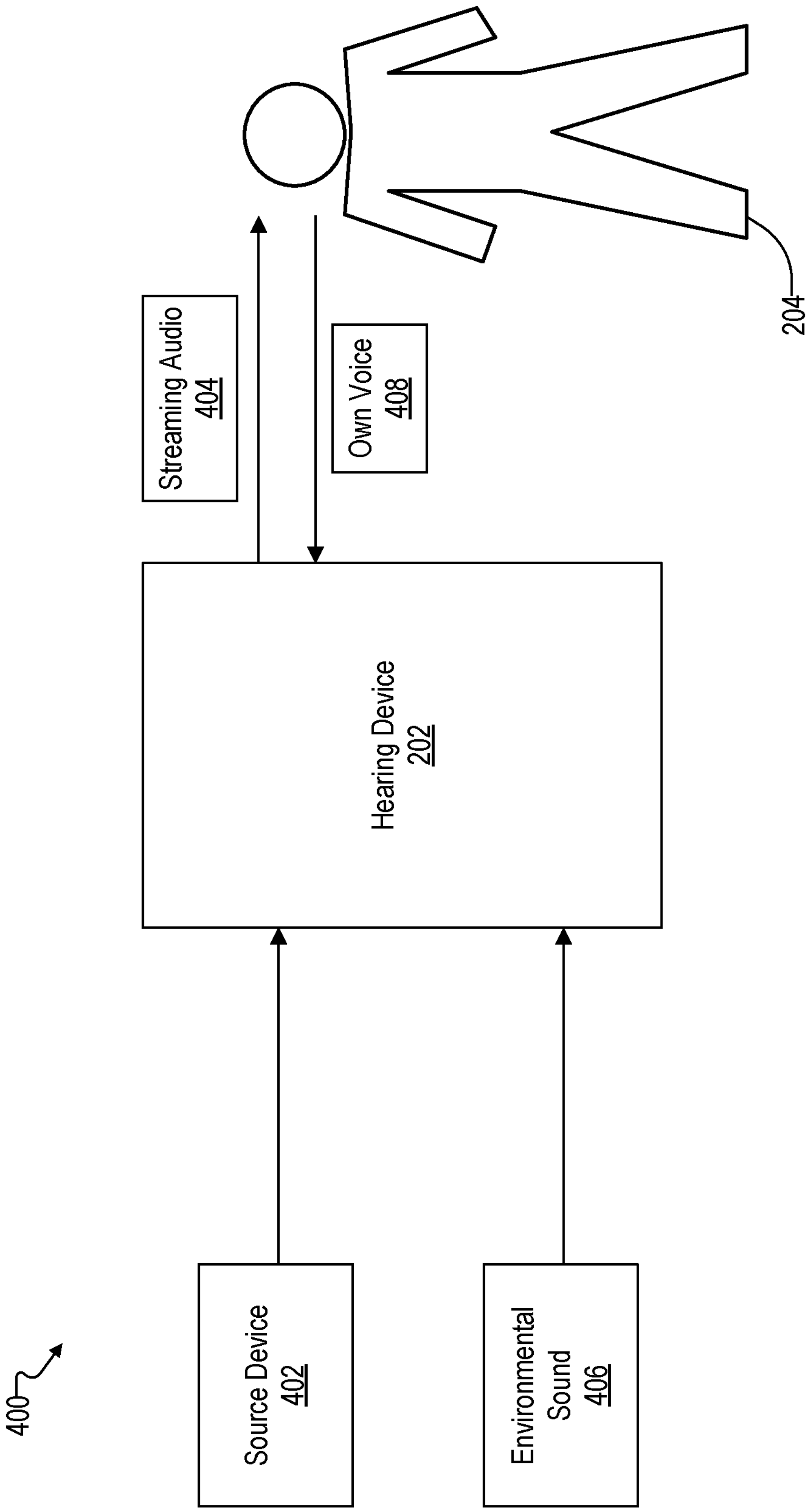

FIG. 4 shows an exemplary implementation 400 that shows hearing device 202 receiving audio streamed from a source device 402 connectively coupled to hearing device 202. Hearing device 202 may provide streaming audio 404 from source device 402 to user 204. System 100 (e.g., implemented by hearing device 202 and/or source device 402) may receive environmental sound 406 (e.g., via hearing device 202 and/or source device 402). System 100 may further detect an own voice 408 of user 204 when user 204 speaks. Further, system 100 may extract signals representative of own voice 408 from signals representative of environmental sound 406. Based on the extracted signal of own voice 408, system 100 may determine a sound level of own voice 408. In addition, extracting own voice 408 signal may enable system 100 to determine a sound level of environmental sound 406 as a sound level of the sound of an environment of user 204 that excludes own voice 408 signal, which may allow system 100 to compare own voice 408 sound level to an environmental sound level independent of own voice 408. Additionally or alternatively, the environmental sound level may be a sound level of an environment of user 204 that includes own voice 408 signal.

Based on the sound level of own voice 408 and the sound level of environmental sound 406, system 100 may adjust a sound level of streaming audio 404 (and/or presented environmental audio) to induce user 204 to speak louder or more softly to increase or decrease the sound level of own voice 408 so that the sound level of own voice 408 may be appropriate for the sound level of environmental sound 406. System 100 may determine whether own voice 408 sound level is appropriate for environmental sound 406 sound level in any suitable manner. For instance, system 100 may compare the sound level of own voice 408 and the sound level of environmental sound 406 and determine whether own voice 408 sound level exceeds environmental sound 406 sound level by a threshold difference level. Additionally or alternatively, system 100 may determine a ratio between own voice 408 sound level and environmental sound 406 sound level and determine whether the ratio exceeds a threshold ratio level. Such thresholds may include a predetermined threshold sound level and/or threshold ratio level. Additionally or alternatively, thresholds may include dynamic thresholds such as a threshold based on own voice 408 sound level and environmental sound 406 sound level. Additionally or alternatively, system 100 may adjust streaming audio 404 sound level continuously based on environmental sound 406 sound level and own voice 408 sound level, such as based on a linear or non-linear function based on a difference between own voice 408 sound level and environmental sound 406 sound level.

Further, in some examples, speech directed toward user 204 (e.g., from conversation partner 304 and/or any other speaker) may be an audio component included in environmental sound 406. System 100 may analyze the speech of conversation partner 304 as a part of environmental sound 406. Additionally or alternatively, system 100 may detect and extract the speech of conversation partner 304 and determine a sound level of the speech. System 100 may adjust the sound level of streaming audio 404 further based on the speech sound level. For instance, system 100 may compare own voice 408 sound level to a weighted combination of the speech sound level and the sound level of environmental sound 406 (which may exclude the speech sound level and/or own voice 408 sound level). Additionally or alternatively, system 100 may adjust the sound level of streaming audio 404 to induce user 204 to match own voice 408 sound level to within a threshold range of the speech sound level. Additionally or alternatively, system 100 may detect changes in speech sound level and further base adjustments of streaming audio 404 sound level on the changes. For example, an increase in speech sound level may indicate an increase in environmental sound 406 level (e.g., based on the Lombard effect on conversation partner 304) and/or indicate conversation partner 304 having difficulty hearing user 204. Consequently, system 100 may include the increase in speech sound level as a factor in adjusting streaming audio 404 sound level.

System 100 may adjust the sound level of streaming audio 404 in any suitable manner. For example, system 100 may adjust the sound level a predetermined amount (e.g., which may be an absolute amount such as 1 decibel (dB) or a percentage such as 1%) at a time. Additionally or alternatively, system 100 may adjust the sound level in predetermined time period increments (e.g., every second, every 10 seconds, etc.). Additionally or alternatively, system 100 may adjust streaming audio 404 sound level based on a difference (and/or a ratio) between own voice 408 sound level and environmental sound 406 level. Thus, if own voice 408 sound level is much too soft or much too loud, system 100 may adjust streaming audio 404 sound level more than if own voice 408 sound level were a little loud or soft. Further, system 100 may continue to adjust streaming audio 404 sound level as user 204 adjusts own voice 408 sound level in response, working as a feedback loop to induce user 204 to achieve the appropriate own voice 408 sound level.

In some examples, however, system 100 may limit the adjustments, such as in a dynamic environment where environmental sound 406 level may be fluctuating relatively rapidly. In such an environment, a rapid fluctuation of streaming audio 404 sound level may become noticeable and/or annoying. Thus, system 100 may include a threshold frequency of adjustment and/or sampling of sound levels. Additionally or alternatively, system 100 may adjust streaming audio 404 sound level based on an average sound level (e.g., of environmental sound 406 and/or own voice 408) over a period of time. For instance, system 100 may take a moving average every 5 seconds (or any other suitable time period) and adjust every 5 seconds based on the moving average sound level of environmental sound 406 and own voice 408. Additionally or alternatively, system 100 may limit or otherwise configure adjustments based on parameters that may be input by user 204.

Further, system 100 may additionally adjust streaming audio 404 sound level based on a sound level of speech directed toward user 204. For example, system 100 may be configured to detect speech directed toward user 204 (e.g., someone such as conversation partner 304 speaking toward user 204) and based on detecting the speech, system 100 may lower streaming audio 404 sound level so that user 204 may be able to hear the speech over streaming audio 404. Such a lowering of streaming audio 404 sound level may preempt user 204 speaking and thus system 100 may adjust streaming audio 404 sound level primarily based on environmental sound 406 level and/or the sound level of the speech directed toward user 204. However, such a preemptive adjusting of streaming audio 404 may allow user 204 to speak with a sound level of own voice 408 that may be appropriate for the conversation given environmental sound 406 sound level. Once user 204 starts speaking, system 100 may further evaluate based on own voice 408 sound level and further adjust as applicable.

In some examples, system 100 may be configured to detect speech directed toward user 204 based on an analysis of the speech. For instance, system 100 may be configured to recognize particular people who may be frequent conversation partners of user 204. Such voice recognition may be implemented in any suitable manner, such as user 204 providing voice samples for system 100 to match, machine learning algorithms configured to learn familiar voices, etc. In this manner, system 100 may respond to speech from people familiar to user 204, adjusting streaming audio 404 sound level so that user 204 may hear them more readily than unfamiliar voices.

Additionally or alternatively, system 100 may analyze content of speech directed toward user 204 and adjust the sound level of streaming audio 404 further based on the content of the speech. For example, if conversation partner 304 asks user 204 to speak more loudly or more softly, system 100 may detect such content and adjust the sound level of streaming audio 404 accordingly to induce the requested adjustment in the sound level of own voice 408 of user 204.

Figure 5:
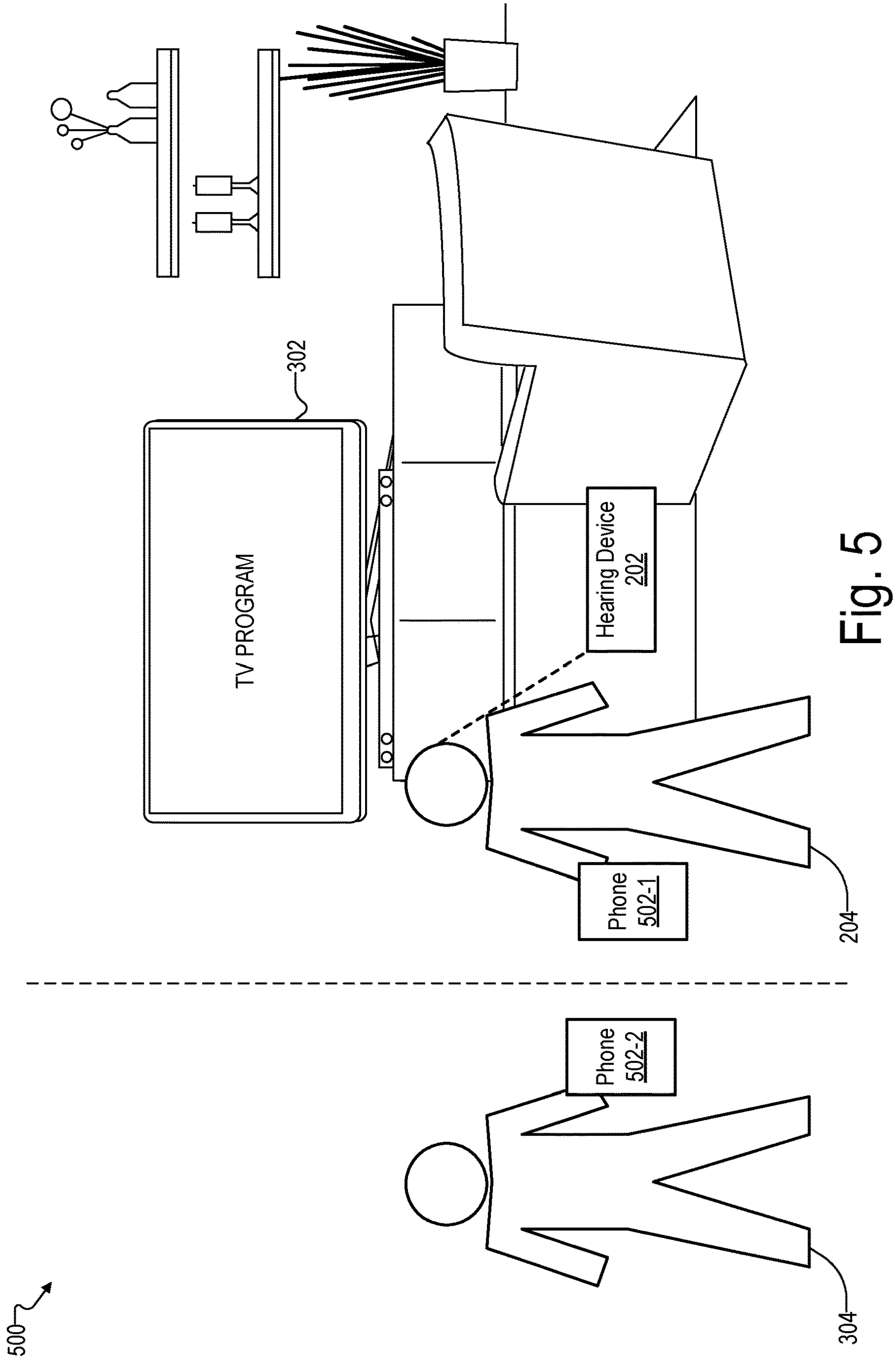

FIG. 5 shows an exemplary implementation 500 where user 204 may be speaking to conversation partner 304 via a source device, such as a phone 502-1, a computing device (e.g., via a video calling application, a meeting application, etc.), or any other source device configured to provide audio from conversation partner 304. In this example, the environmental sound may include audio from TV 302, while phone 502-1 may be communicatively connected to hearing device 202 and providing streaming audio to hearing device 202. Further, system 100 (e.g., via hearing device 202) may be configured to present environmental sound in addition to the streaming audio. Conversation partner 304 may be in another location, speaking to user 204 via phone 502 (e.g., phone 502-2 of conversation partner 304 and phone 502-1 of user 204).

In some implementations, hearing device 202 may be configured to process sound presented to user 204 differently for when user 204 is using phone 502-1 (or other source device for speaking to conversation partner 304). For instance, hearing device 202 may present to user 204 environmental sound at a lower sound level than the actual environmental sound level and/or at a lower sound level relative to a sound level of a voice of conversation partner 304. Hearing device 202 may include such a feature so that user 204 may be able to readily hear and understand conversation partner 304. However, as a result of hearing device 202 lowering the presented environmental sound level, user 204 may speak with an own voice sound level that is too low for conversation partner 304 to be able to easily hear user 204 given the actual environmental sound level, as the environmental sound may be picked up by phone 502-1 (and/or hearing device 202) and transmitted by phone 502-1 to conversation partner 304. Accordingly, system 100 may adjust the audio provided by hearing device 202 by increasing the streaming audio sound level and/or the presented environmental sound level. By increasing the sound level of the audio provided by hearing device 202, system 100 may induce user 204 to speak louder and increase the own voice level so that conversation partner 304 may be able to better hear given the environmental sound level.

In some examples, system 100 may adjust the streaming audio sound level to a first sound level while user 204 is speaking (e.g., raising the streaming audio sound level to induce user 204 to speak louder) and to a second sound level while user 204 is not speaking and/or conversation partner 304 is speaking (e.g., lower the streaming audio sound level so that user 204 may hear conversation partner 304 more clearly). For instance, system 100 may adjust the streaming audio sound level to the first level based on the own voice sound level of user 204 being above a first threshold. System 100 may further adjust the streaming audio sound level to the second level based on the own voice sound level falling below the first threshold and/or below a second threshold. Additionally or alternatively, system 100 may adjust the streaming audio sound level to the second level based on a speech sound level from conversation partner 304 being above a third threshold.

Additionally or alternatively, system 100 may receive and provide audio from an environment of conversation partner 304. For instance, phone 502-2 may pick up sound from an environment of conversation partner 304 in addition to speech of conversation partner 304. System 100 may extract the speech of conversation partner 304 from the environmental sound of conversation partner 304 and present the speech at a different sound level than a sound level of the environmental sound of conversation partner 304. For example, system 100 may increase the sound level of the presented speech audio of conversation partner 304 while decreasing the sound level of the presented environmental sound audio of conversation partner 304 so that user 204 may hear conversation partner 304 easily regardless of an actual sound level of the environment of conversation partner 304.

Additionally or alternatively, system 100 may adjust the sound level of the presented environmental sound audio of conversation partner 304 in addition to or instead of the sound level of the presented environmental sound audio of user 204 to induce user 204 to adjust the own voice level of user 204. For instance, if an environmental sound level of user 204 is relatively quiet but an environmental sound level of conversation partner 304 is relatively loud, user 204 speaking relatively quietly may be appropriate for the sound level of the environment of user 204, but conversation partner 304 may still be unable to hear user 204 because the environmental sound level of conversation partner 304 is too loud. Accordingly, system 100 may increase the sound level of presented environmental sound audio of conversation partner 304 to induce user 204 to speak louder (e.g., to match an appropriate level of the environmental sound level of conversation partner 304) so that conversation partner 304 may hear user 204.

Figure 6:
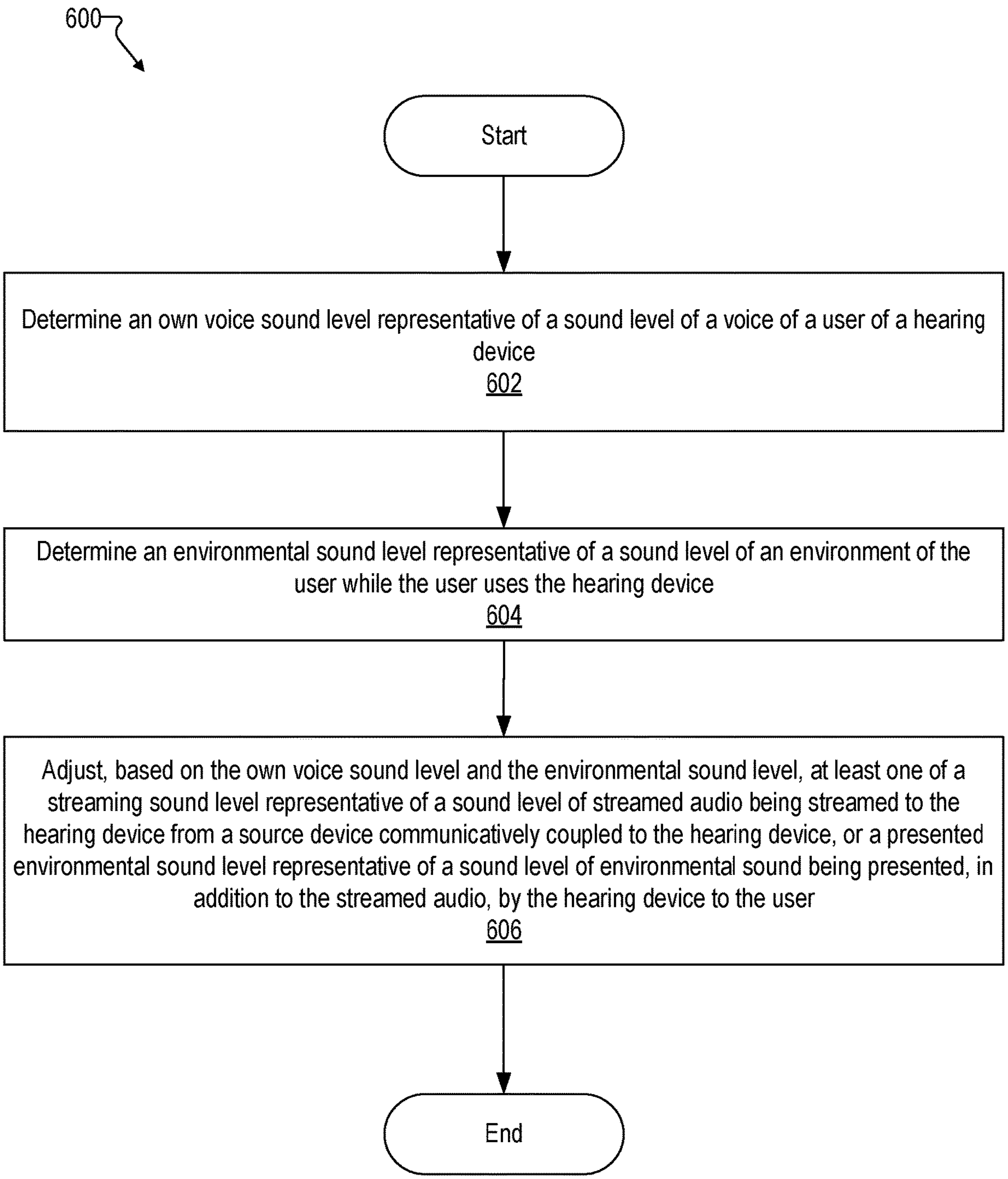
FIG. 6 illustrates an exemplary method according to principles described herein.

FIG. 6 illustrates an exemplary method 600 for inducing modulation of a user's voice level by a hearing device according to principles described herein. While FIG. 6 illustrates exemplary operations according to one embodiment, other embodiments may omit, add to, reorder, and/or modify any of the operations shown in FIG. 6. One or more of the operations shown in FIG. 6 may be performed by a hearing device such as hearing device 202, a computing device such as computing device 206, an additional computing device communicatively coupled to computing device 206 and/or hearing device 202, any components included therein, and/or any combination or implementation thereof.

At operation 602, a hearing system such as hearing system 100 may determine an own voice sound level representative of a sound level of a voice of a user of a hearing device. Operation 602 may be performed in any of the ways described herein.

At operation 604, the hearing system may determine an environmental sound level representative of a sound level of an environment of the user while the user uses the hearing device. Operation 604 may be performed in any of the ways described herein.

At operation 606, the hearing system may adjust, based on the own voice sound level and the environmental sound level, at least one of a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user. Operation 606 may be performed in any of the ways described herein.

In some examples, a computer program product embodied in a non-transitory computer-readable storage medium may be provided. In such examples, the non-transitory computer-readable storage medium may store computer-readable instructions in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 7:
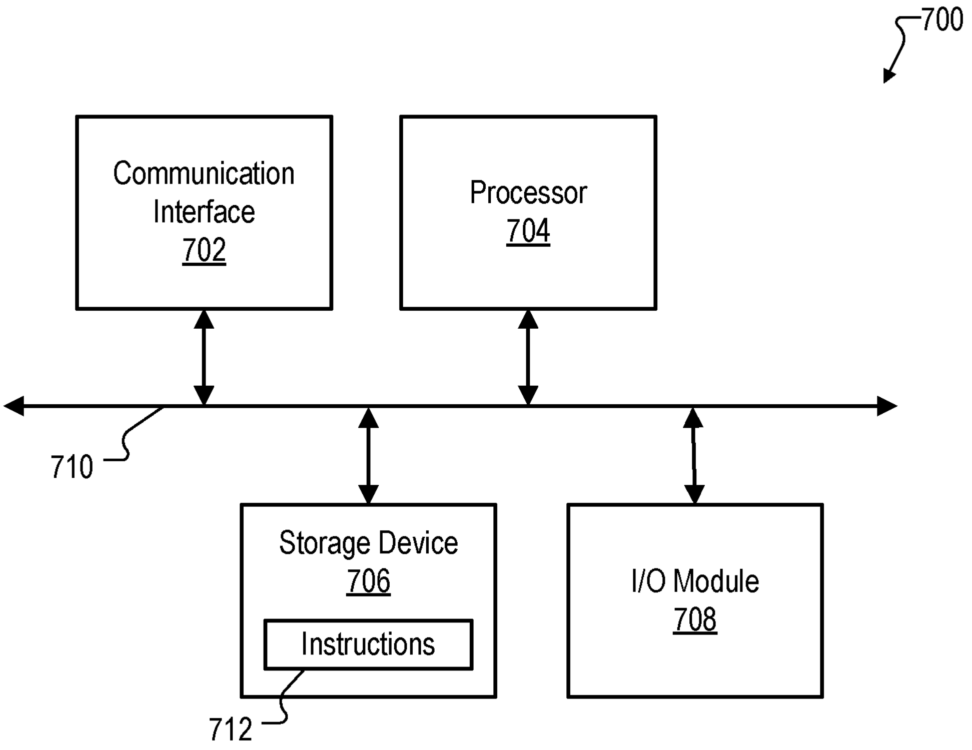
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected one to another via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 700. For example, memory 102 and/or memory 210 may be implemented by storage device 706, and processor 104 and/or processor 212 may be implemented by processor 704.

Figure 8:
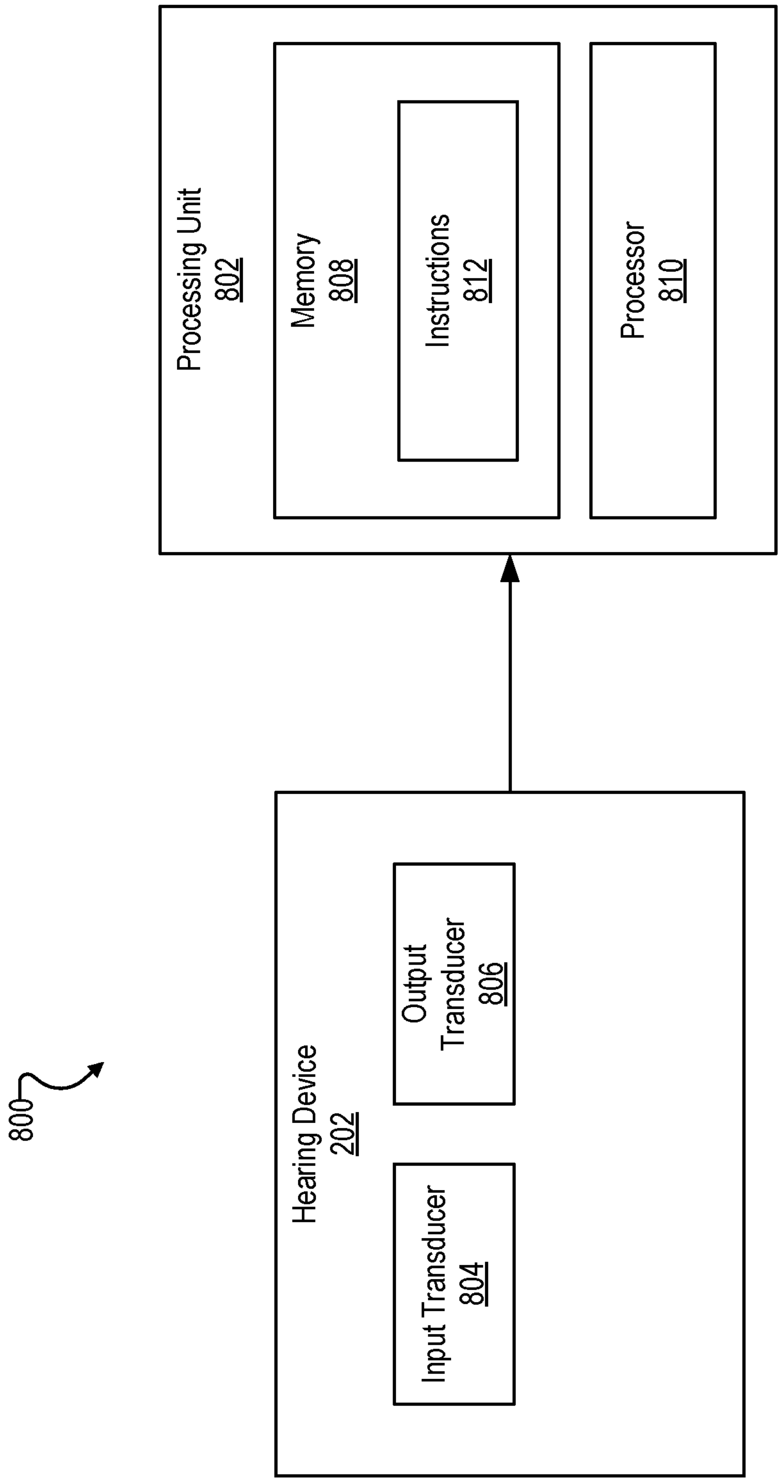
FIGS. 8-9 illustrate exemplary hearing systems that may be implemented according to principles described herein.

FIG. 8 shows an illustrative implementation 800 of a hearing system configured to induce modulation of a user's voice level. As shown, implementation 800 includes a hearing device 202 communicatively coupled with a processing unit 802 (e.g., an implementation of computing device 206 and/or other processing unit). Implementation 800 may include additional or alternative components as may serve a particular implementation.

Hearing device 202 may be implemented by any type of hearing device configured to enable or enhance hearing by a user wearing hearing device 202. For example, hearing device 202 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis.

As shown, hearing device 202 includes one or more input transducers 804 and an output transducer 806. Hearing device 202 may include additional or alternative components as may serve a particular implementation.

Input transducer 804 may include an electroacoustic transducer, e.g., a microphone and/or a microphone array. The microphone may be implemented by one or more suitable audio detection devices configured to detect audio data representative of one or more audio signals presented to a user of hearing device 202. The one or more audio signals may include, for example, audio content (e.g., music, speech, noise, etc.) generated by one or more audio sources included in an environment of the user (e.g., environmental audio/sound). Each microphone may be included in or communicatively coupled to hearing device 202 in any suitable manner. Additionally or alternatively, input transducer 804 may include a radio frequency (RF) receiver configured to receive RF signals including audio data representative of one or more audio signals presented to the user of hearing device 202. For instance, the RF signals may be received in accordance with a Bluetooth™ protocol and/or by a mobile phone network such as 4G or 5G and/or by any other type of RF communication such as, for example, data communication via an internet connection and/or data communication at a frequency in a GHz range. The audio signal may include, for example, a phone call signal and/or a streaming signal which may be received while delivered from an audio provider, such as a phone call signal provider and/or a streaming media provider and/or may comprise a signal transmitted from a source device, e.g., a smartphone. Each RF receiver may be included in hearing device 202 and/or communicatively coupled to hearing device 202 in any suitable manner.

The audio data detected and/or received by one or more input transducers 804 may include one or more speech signals representative of a speech from a one or more speech sources different from the user. E.g., the one or more speech signals may include a speech from a conversation partner in the user's environment, a speech from a conversation partner in a phone call, a speech from a chatbot, a speech in a media playback equipment such as a TV, a speech from a conversation partner in an audio or video communication platform, etc. In some examples, the one or more speech signals may be extracted and/or separated from the audio data, e.g. by a signal analysis performed on the audio data and/or by a machine learning (ML) algorithm configured to separate the one or more speech signals from the audio data.

Output transducer 806 may be implemented by any suitable audio output device, for instance a loudspeaker of a hearing device or an output electrode of a cochlear implant system. In some instances, the audio data detected by one or more input transducers 804 may include own voice data representative of an own-voice activity of the user. In some examples, the own voice data may be extracted and/or separated from the audio data, e.g. by a signal analysis performed on the audio data and/or by a machine learning (ML) algorithm configured to separate the own voice data from the audio data. Additionally or alternatively, one or more input transducers 804 may include an own-voice detector, e.g., a microphone and/or a motion sensor configured to pick up a bone conducted sound from the user's skull, an ear canal microphone, and/or the like. The own voice data may be representative of any sound produced by the user's vocal cords, e.g., speech, non-speech, paralinguistic expressions, laughter, giggling, moaning, monosyllabic and polysyllabic utterances, etc.

Processing unit 802 may be implemented by one or more computing devices and/or computer resources (e.g., processors, memory devices, storage devices, etc.) as may serve a particular implementation, such as processor 104. For example, processing unit 802 may be implemented by a mobile device, personal computer, and/or other computing device configured to be communicatively coupled (e.g., by way of a wired and/or wireless connection) to hearing device 202. As shown, processing unit 802 may include, without limitation, a memory 808 and a processor 810 selectively and communicatively coupled to one another. Memory 808 and processor 810 may each include or be implemented by computer hardware that is configured to store and/or process computer software. Various other components of computer hardware and/or software not explicitly shown in FIG. 8 may also be included within processing unit 802. In some examples, memory 808 and/or processor 810 may be distributed between multiple devices and/or multiple locations as may serve a particular implementation.

Memory 808 may store and/or otherwise maintain executable data used by processor 810 to perform any of the functionality described herein. For example, memory 808 may store instructions 812 that may be executed by processor 810. Memory 808 may be an implementation of memory 102.

Processor 810 (e.g., an implementation of processor 104) may be implemented by one or more computer processing devices, including general purpose processors (e.g., central processing units (CPUs), digital signal processors (DSPs), graphics processing units (GPUs), microprocessors, etc.), special purpose processors (e.g., application specific integrated circuits (ASICs), field-programmable gate arrays (FPGAs), etc.), image signal processors, or the like. Using processor 810 (e.g., when processor 810 is directed to perform operations represented by instructions 812 stored in memory 808), processing unit 802 may perform various operations as described herein.

Figure 9:
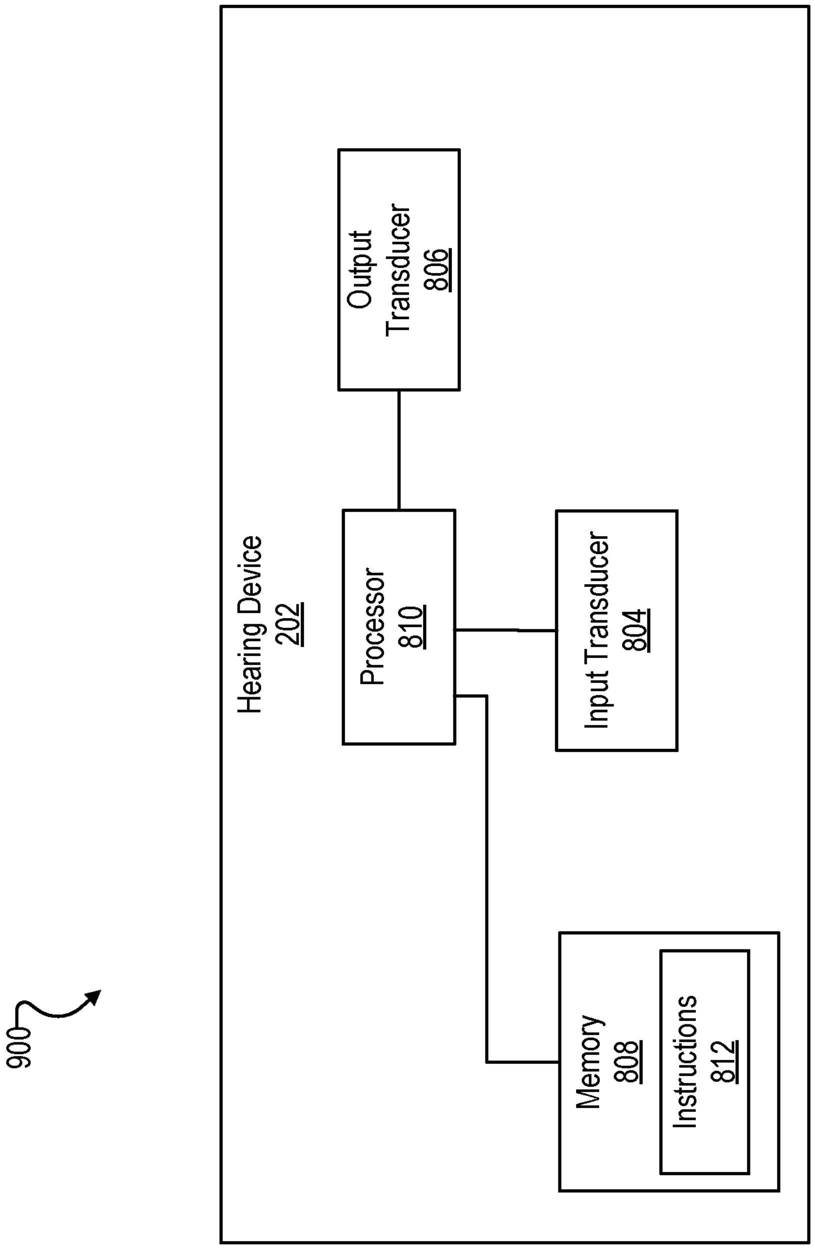

FIG. 9 shows another illustrative implementation 900 of a hearing system configured to induce modulation of a user's voice level. As shown, implementation 900 is similar to implementation 800, except that implementation 900 includes processor 810 and memory 808 located within hearing device 202. Implementation 900 may include additional or alternative components as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

determining, by a processor, an own voice sound level representative of a sound level of a voice of a user of a hearing device;

determining, by the processor, an environmental sound level representative of a sound level of an environment of the user while the user uses the hearing device;

determining, by the processor and based on a comparing of the environmental sound level and the own voice sound level, that the own voice sound level is too high or too low for a conversation with a conversation partner; and adjusting, by the processor and based on the determining that the own voice sound level is too high or too low, at least one of:

a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user.

2. The method of claim 1, wherein the determining that the own voice sound level is too high or too low is based on a difference between the own voice sound level and the environmental sound level exceeding a threshold difference level.

3. The method of claim 1, wherein the determining that the own voice sound level is too high or too low is based on a ratio between the own voice sound level and the environmental sound level exceeding a threshold ratio level.

4. The method of claim 1, wherein:

the adjusting the streaming sound level or the presented environmental sound level comprises decreasing, based on the determining that the own voice sound level is too high, the streaming sound level or the presented environmental sound level.

5. The method of claim 1, wherein:

the adjusting the streaming sound level or the presented environmental sound level comprises increasing, based on the determining that the own voice sound level is too low, the streaming sound level or the presented environmental sound level.

6. The method of claim 1, wherein the environment sound level comprises a speech sound level of speech directed toward the user.

7. The method of claim 6, further comprising:

detecting the speech directed toward the user; and additionally adjusting, based on the speech sound level, the streaming sound level or the presented environmental sound level.

8. The method of claim 7, wherein:

the adjusting the streaming sound level or the presented environmental sound level comprises setting the streaming sound level or the presented environmental sound level at a first sound level while the own voice sound level is above a first threshold sound level; and the additionally adjusting the streaming sound level or the presented environmental sound level comprises setting the streaming sound level or the presented environmental sound level at a second sound level while the speech sound level is above a second threshold sound level.

9. The method of claim 1, wherein:

the adjusting the streaming sound level or the presented environmental sound level comprises setting the streaming sound level or the presented environmental sound level at a first sound level while the own voice sound level is above a first threshold sound level; and the adjusting the streaming sound level or the presented environmental sound level further comprises setting the streaming sound level or the presented environmental sound level at a second sound level while the own voice sound level is below a second threshold sound level.

10. A computer program product embodied in a non-transitory computer-readable storage medium and comprising computer instructions for performing a process comprising:

determining an own voice sound level representative of a sound level of a voice of a user of a hearing device;

determining an environmental sound level representative of a sound level of an environment of the user while the user uses the hearing device;

determining, based on a comparing of the environmental sound level and the own voice sound level, that the own voice sound level is too high or too low for a conversation with a conversation partner; and adjusting, based on the determining that the own voice sound level is too high or too low, at least one of:

a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user.

11. The computer program product of claim 10, wherein the determining that the own voice sound level is too high or too low is based on a difference between the own voice sound level and the environmental sound level exceeding a threshold difference level.

12. The computer program product of claim 10, wherein;

the adjusting the streaming sound level or the presented environmental sound level comprises decreasing, based on the determining that the own voice sound level is too high, the streaming sound level or the presented environmental sound level.

13. The computer program product of claim 10, wherein;

the adjusting the streaming sound level or the presented environmental sound level comprises increasing, based on the determining that the own voice sound level is too low, the streaming sound level or the presented environmental sound level.

14. The computer program product of claim 10, wherein:

the process further comprises:

detecting speech directed toward the user, and determining a speech sound level of the speech; and the adjusting the streaming sound level or the presented environmental sound level is further based on the speech sound level.

15. The computer program product of claim 10, wherein:

the adjusting the streaming sound level or the presented environmental sound level comprises setting the streaming sound level or the presented environmental sound level at a first sound level while the own voice sound level is above a first threshold sound level; and the adjusting the streaming sound level or the presented environmental sound level further comprises setting the streaming sound level or the presented environmental sound level at a second sound level while the own voice sound level is below a second threshold sound level.

16. A system comprising:

a memory that stores instructions; and a processor communicatively coupled to the memory and configured to execute the instructions to perform a process comprising:

determining an own voice sound level representative of a sound level of a voice of a user of a hearing device;

determining an environmental sound level representative of a sound level of an environment of the user while the user uses the hearing device;

determining, based on a comparing of the environmental sound level and the own voice sound level, that the own voice sound level is too high or too low for a conversation with a conversation partner; and adjusting, based on the determining that the own voice sound level is too high or too low, at least one of:

a streaming sound level representative of a sound level of streamed audio being streamed to the hearing device from a source device communicatively coupled to the hearing device, or a presented environmental sound level representative of a sound level of environmental sound being presented, in addition to the streamed audio, by the hearing device to the user.

17. The system of claim 16, wherein:

the adjusting the streaming sound level or the presented environmental sound level comprises decreasing, based on the determining that the own voice sound level is too high, the streaming sound level or the presented environmental sound level.

18. The system of claim 16, wherein;

the adjusting the streaming sound level or the presented environmental sound level comprises increasing, based on the determining that the own voice sound level is too low, the streaming sound level or the presented environmental sound level.

19. The system of claim 17, wherein:

the process further comprises:

detecting speech directed toward the user, and determining a speech sound level of the speech; and the adjusting the streaming sound level or the presented environmental sound level is further based on the speech sound level.

20. The system of claim 17, wherein:

the adjusting the streaming sound level or the presented environmental sound level comprises setting the streaming sound level or the presented environmental sound level at a first sound level while the own voice sound level is above a first threshold sound level; and the adjusting the streaming sound level or the presented environmental sound level further comprises setting the streaming sound level or the presented environmental sound level at a second sound level while the own voice sound level is below a second threshold sound level.

* * * * *